(12) United States Patent
Bales et al.

(10) Patent No.: US 10,858,945 B2
(45) Date of Patent: Dec. 8, 2020

(54) APPARATUS AND METHOD FOR SELECTIVE BONDING TO FORM HOLLOW COMPONENTS

(71) Applicant: United Technologies Corporation, Farmington, CT (US)

(72) Inventors: Daniel A. Bales, Avon, CT (US); Russell A. Beers, Manchester, CT (US); Thomas DeMichael, Stafford Springs, CT (US); Eric W. Malmborg, Amston, CT (US); Francis B. Parisi, West Suffield, CT (US)

(73) Assignee: United Technologies Corporation, Farmington, CT (US)

( * ) Notice: Subject to any disclaimer, the term of this patent is extended or adjusted under 35 U.S.C. 154(b) by 289 days.

(21) Appl. No.: 15/869,836

(22) Filed: Jan. 12, 2018

(65) Prior Publication Data

US 2019/0218915 A1  Jul. 18, 2019

(51) Int. Cl.
*B23K 37/00* (2006.01)
*F01D 5/18* (2006.01)
(Continued)

(52) U.S. Cl.
CPC ............ *F01D 5/181* (2013.01); *B23K 1/0018* (2013.01); *B23K 3/087* (2013.01); *B23K 20/023* (2013.01);
(Continued)

(58) Field of Classification Search
CPC .......... B23K 2101/001; B23K 37/0443; B23K 20/023; B23K 1/0018; B23K 1/008; B23K 20/021; B23K 2101/02; B23K 2103/14; B23K 3/087; B23K 1/0014; B23K 20/002; B23K 20/02; B23K 20/16; B23K 20/233; B23K 20/26; B23K 2101/04; B23K 26/24; B23K 31/02; B23K 37/04; B23K 37/0426
See application file for complete search history.

(56) References Cited

U.S. PATENT DOCUMENTS 3,427,435 A * 2/1969 Eckles .................... A21B 2/00
219/411
5,099,573 A 3/1992 Krauss et al.
(Continued)

FOREIGN PATENT DOCUMENTS

EP          3434867 A1    1/2019

OTHER PUBLICATIONS

Extended European Search Report for EP Application No. 19151017.1, dated Jul. 22, 2019, 9 pages.

*Primary Examiner* — Erin B Saad
(74) *Attorney, Agent, or Firm* — Kinney & Lange, P.A.

(57) ABSTRACT

An embodiment of an apparatus includes means for peripherally welding a cavity-back blade and a cover of the cavity-back blade to form a 3-dimensional hollow blade assembly, and a plurality of bellows contained in one or both of a first die half and a second die half receiving the 3-dimensional hollow blade assembly. The plurality of bellows are disposed within the region defined around or inward of the peripherally welded interface of the cover and the blade. At least a portion of the plurality of bellows are arranged in a manner to provide pressure to the cover at approximately a 90 degree angle to each of a plurality of nodes, each node defined by an intersection of two or more ribs in the cavity-back blade.

14 Claims, 8 Drawing Sheets

(51) Int. Cl.
  *B29C 65/02*  (2006.01)
  *B23K 26/24*  (2014.01)
  *B23P 15/04*  (2006.01)
  *F01D 5/14*  (2006.01)
  *B23K 3/08*  (2006.01)
  *B23K 37/04*  (2006.01)
  *F01D 5/26*  (2006.01)
  *B23K 1/00*  (2006.01)
  *B23K 20/02*  (2006.01)
  *B23K 101/00*  (2006.01)
  *B23K 101/04*  (2006.01)
  *B23K 101/02*  (2006.01)

(52) U.S. Cl.
  CPC .............. *B23K 26/24* (2013.01); *B23K 37/04* (2013.01); *B23P 15/04* (2013.01); *B29C 65/02* (2013.01); *F01D 5/147* (2013.01); *F01D 5/18* (2013.01); *F01D 5/26* (2013.01); *B23K 2101/001* (2018.08); *B23K 2101/02* (2018.08); *B23K 2101/04* (2018.08); *F05D 2220/36* (2013.01); *F05D 2230/232* (2013.01)

(56) References Cited

U.S. PATENT DOCUMENTS

| | | |
|---|---|---|
| 5,259,730 A | 11/1993 | Damlis et al. |
| 6,003,756 A | 12/1999 | Rhodes |
| 8,920,893 B2 | 12/2014 | Strother |
| 2010/0247949 A1 | 9/2010 | VanDyke et al. |

\* cited by examiner

APPARATUS AND METHOD FOR SELECTIVE BONDING TO FORM HOLLOW COMPONENTS

BACKGROUND

This disclosure relates generally to bonding metal components, and more specifically to bonding and shaping components such as airfoils.

Diffusion bonding is a common method for creating hollow, high-temperature alloy components with complex geometries. For example, lightweight hollow titanium alloy airfoils (and particularly fan blades) are produced using costly, massive dies and presses. Traditionally, pressure is applied to the entire blade surface and requires wholly reshaping an airfoil from a flat configuration to a 3-dimensional configuration after initial bonding of the flat sheets. This reshaping process imparts internal stresses, distortion, collapsed cavities, and other shortcomings which must be addressed by post-processing, annealing, and the like. Thus a key to successfully manufacturing a finished blade, according to previous methods, is being able to perform the bonding, brazing, and/or welding while ensuring residual stresses induced by thermal mechanical processing steps are properly managed and subsequently relieved without affecting acceptable airfoil dimensions.

Other airfoils can be made from a combination of materials, such as ceramic matrix composites, aluminum alloys, and optionally strengthened by a titanium or nickel sheath subsequently applied adhesively to weaker areas of the blade in order to defend against bird strikes or other foreign object damage (FOD). These complex processes also require substantial investments in equipment and materials and often have limited throughput and yield.

SUMMARY

An embodiment of an apparatus includes means for peripherally welding a cavity-back blade and a cover of the cavity-back blade to form a 3-dimensional hollow blade assembly, and a plurality of bellows contained in one or both of a first die half and a second die half receiving the 3-dimensional hollow blade assembly. The plurality of bellows are disposed within the region defined around or inward of the peripherally welded interface of the cover and the blade. At least a portion of the bellows are arranged in a manner to provide pressure to the 3-dimensional cover at approximately a 90 degree angle to each of a plurality of nodes, each node defined by an intersection of two or more ribs in the cavity-back blade.

An embodiment of a method for making a hollow metal blade includes peripherally welding a cavity-back blade and a cover around an interface therebetween. The cover is adapted to engage an opening in the 3-dimensional hollow cavity-back blade combining the blade and the cover to form a 3-dimensional hollow blade assembly. The 3-dimensional welded hollow blade assembly is placed in a die having a first die half and a second die half to accept the 3-dimensional hollow blade assembly. A plurality of bellows are selectively operated to locally press the hollow cavity-back blade assembly together at a plurality of nodes around or inward of the welded interface of the blade and the cover. The plurality of bellows are arranged in a manner to provide localized pressure to the cover at approximately a 90 degree angle to each of the plurality of nodes, each node defined by an intersection of two or more ribs in the hollow cavity-back blade assembly.

DETAILED DESCRIPTION

Figure 1:
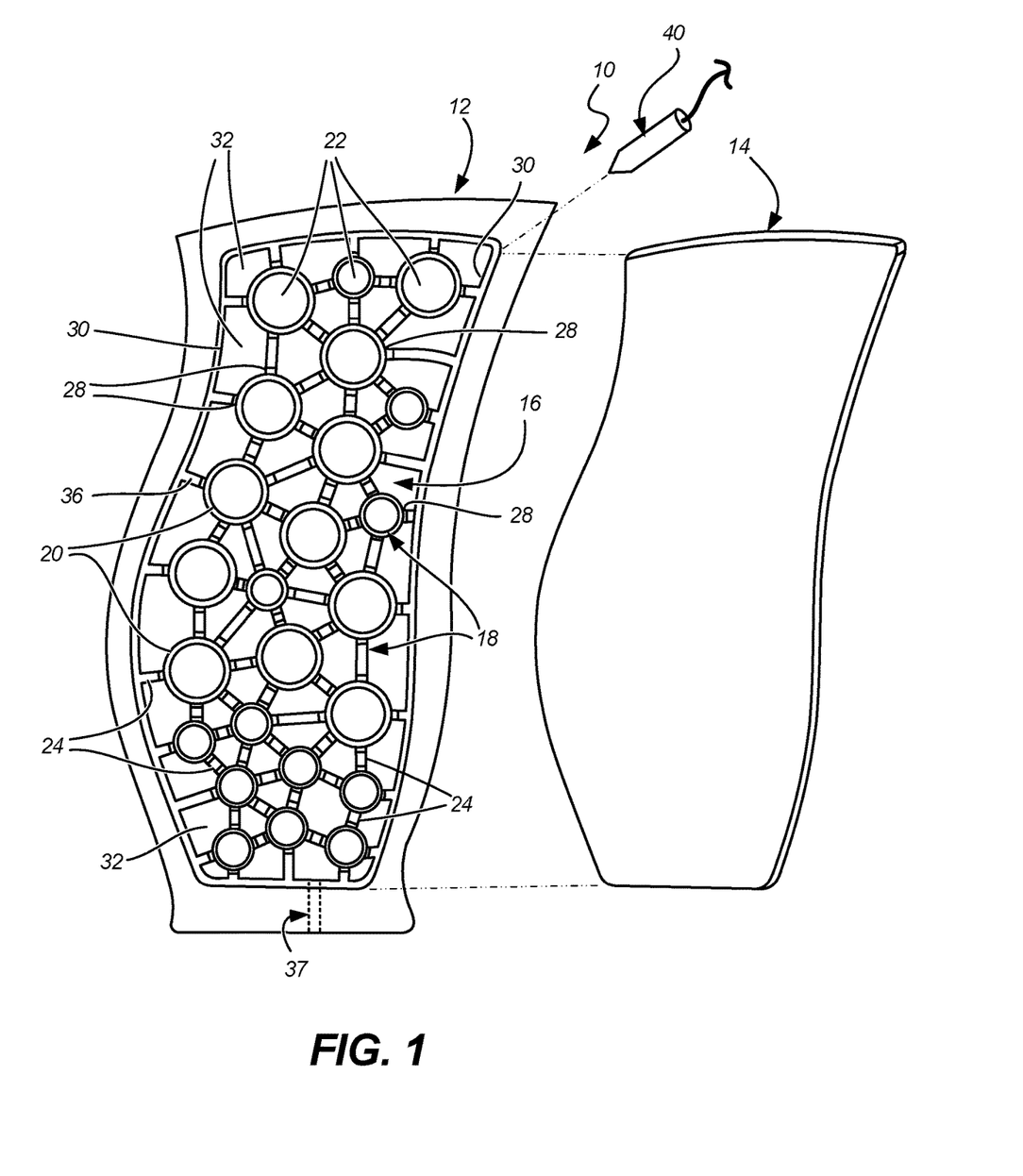
FIG. 1 shows an exploded view of an example 3-dimensional cavity-back blade assembly prior to joining according to the disclosure.

FIG. 1 is a front exploded view of an embodiment of hollow fan blade assembly 10. Fan blade assembly 10 includes cavity-back blade 12 and cover 14 removed therefrom. Within main cavity 16 of cavity-back blade 12 are ribs 18 having cylindrical portions 20, annular pockets 22 within cylindrical portions 20, and linear rib portions 24, some of which connect to cylindrical portions 20 at nodes 28. Cavity-back blade 12 and cover 14 are, e.g., titanium alloys, but are not necessarily so limited. Cavity 16 of cavity-back blade 12 also can include peripheral recessed portion/cover interface 30, and cavity pockets 32 between and around cylindrical rib portions 20 and linear rib portions 24.

Annular pockets 22 are annular cavities located within cylindrical rib portions 20. Cavity pockets 32 extend closer to a perimeter of recessed portion/cover interface 30 such that the periphery of recessed portion 30 can be narrower than linear rib portions. Any number of linear rib portions 24 may include and/or be connected cylindrical rib portions 20. Diameters of cylindrical rib portions 20 may vary throughout fan blade assembly 10, for example, based on the structural needs of fan blade 10. Alternatively, diameters of cylindrical portions 20 may be mostly or all substantially the same throughout fan blade 10. A height of rib portions 20, 24 can also vary throughout blade assembly 10. For example, linear portions of ribs 24 that do not include cylindrical portions 20, and that do not reach the periphery of recessed portion 30 may be machined down to a third depth, the third depth being deeper than the first depth of the periphery of recessed portion 30, but not as deep as the second depth of cavity pockets 32. As a result, a space can be formed, for example, between cover 14 and certain linear rib portions 24, such that cover 14 is not in contact therewith.

Linear rib portions 24 and/or cylindrical rib portions 20 can include tops 36 and grooves 28. In this example, grooves 28 are grooves or cut-outs in tops 36 of one or more linear rib portions 24 adjacent to cylindrical portions 20. Grooves 28, where present, extend down a portion of top 36 of linear rib portions 24 such that grooves 28 fluidly connect one or more cavity pockets 32, even when cover 14 is in place. As such, most or all cavity pockets 32 can be pressurized to the same or similar degrees by introducing inert gas into as few as one cavity pocket 32. For example, to carry out an argon gas pressurization operation, gas can be introduced into a single cavity pocket 32 through a hole or passageway 37 that extends from the root of the blade into the pocket. The pressurizing gas will then flow into and pressurize all cavity pockets 32 of fan blade 10 connected by grooves 28.

FIG. 1 also shows weld apparatus 40 for peripherally tack welding cavity back blade 12 and cover 14 to join 3-dimensional hollow blade assembly 10. Tack welding may be a fusion process or a solid state welding technique. Additionally, FIG. 1 shows a fusion weld apparatus, such as laser, electron beam, or other fusion welding techniques, for joining cover 14 to recessed portion/cover interface 30. Subsequent to welding the periphery, 3-dimensional blade assembly 10 is placed in a die assembly according to subsequent figures, in order to diffusion bond, braze, and/or stress-relieve the peripheral weld and blade for use in an engine.

Note that, as all physical objects such as a blade have three dimensions, a "3-dimensional" hollow blade assembly can be considered one where the desired shape, twist, camber, and other near-final aerodynamic features that define a particular airfoil's performance are already formed into the assembly. This can be distinguished from a generally "flat" blade assembly formed as an intermediary to a traditional diffusion bonding/superplastic forming process, starting with initially flat metal sheets and going through numerous steps to form a final desired airfoil shape that define a particular airfoil's performance in an engine.

Other blade and airfoil geometries suitable for incorporation into the instant disclosure are shown and described in commonly owned U.S. patent application Ser. No. 15/670,654 by Daniel Bales et al., filed on Aug. 7, 2017, and which is incorporated herein by reference in its entirety.

Figure 2:
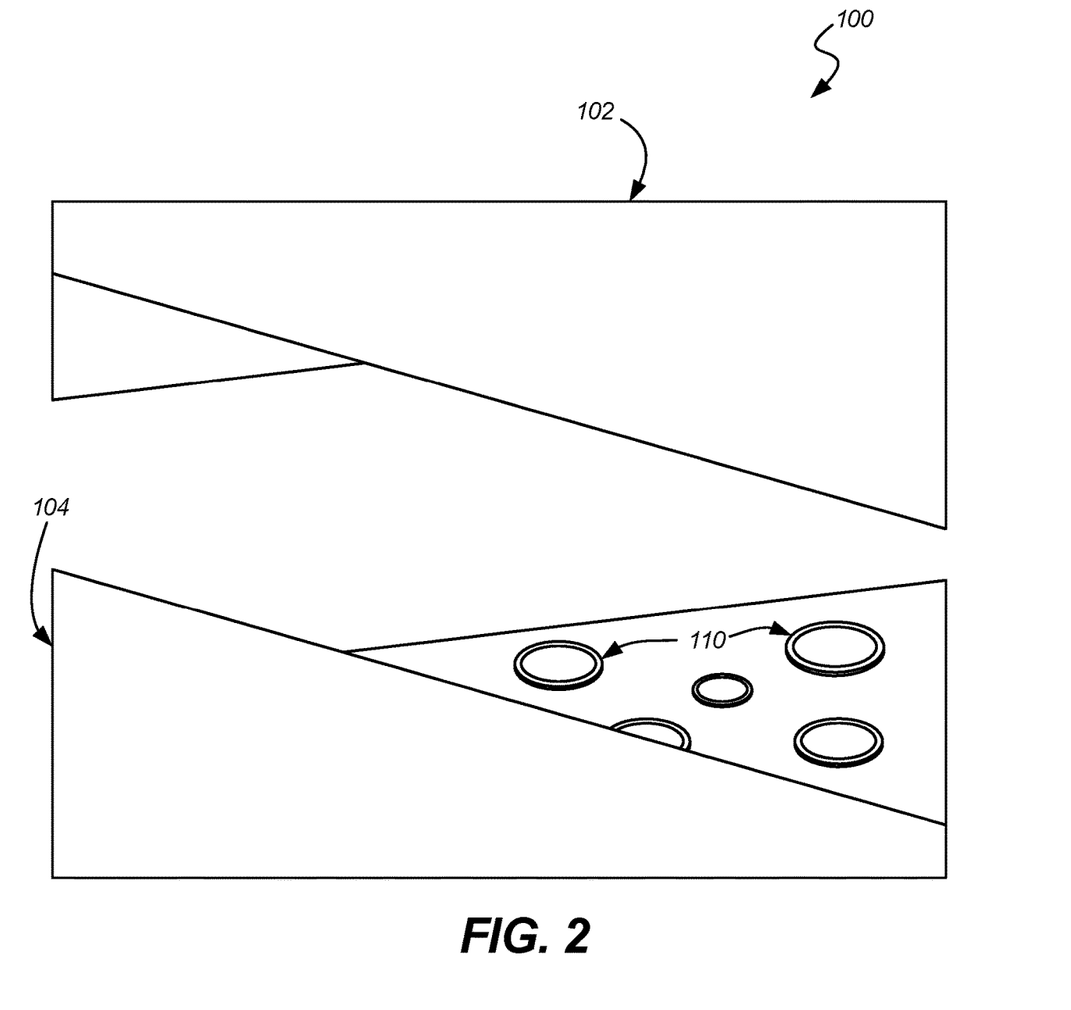
FIG. 2 shows a perspective of a die including first and second 3-dimensional die halves, one die half surface having multiple bellows.

FIG. 2 shows a die apparatus 100 for diffusion bonding or brazing a hollow blade such as the example shown in FIG. 1. First die half 102 and second opposing die half 104 receive a 3-dimensional hollow blade (e.g., blade assembly 10 from FIG. 1) after it has been welded around its perimeter/cover interface (See FIG. 1). First and second die halves 102, 104 are shaped, for example, to ensure maintaining the 3-dimensional shape of preferably about 20° to about 40° relative to a chordwise direction of the combination of cavity-back blade 12 and cover 14. Other features, shown and discussed in this disclosure, permit additional minor shaping to occur with a minimum of residual stresses and deformation.

Conventionally, the two blade parts shown in FIG. 1 would be placed in a second diffusion bonding machine to impart a final shape after initial bonding as a straight (i.e., flat or untwisted) airfoil shape. In the past, lightweight hollow metal airfoils (and particularly fan blades) have been produced using costly, massive dies and presses. In such an arrangement, two blade halves (each half containing ribs, cavities, and a root) would be placed in a heated press for diffusion bonding as a substantially flat airfoil along its neutral axis, then concurrently heat treated and pre-formed to a 3-dimensional shape in a protective environment, then placed in a 3-dimensional heated die set within a press for final forming the airfoil to its finished shape. This imparts plastic strain, internal distortion, and initial degradation of microstructure and mechanical properties which must be addressed and recovered during post-processing; solution heat treatment, annealing, and the like. Thus a key to successfully manufacturing a finished blade, according to previous methods, is being able to perform the bonding, brazing, and/or welding while ensuring residual stresses induced by thermal mechanical processing steps are properly managed and subsequently relieved without affecting acceptable final airfoil dimensions, mechanical properties, and microstructure.

In contrast, as seen in FIG. 2, a plurality of bellows 110 can be placed on one or both of the first and second die halves 102, 104, and disposed at least around the peripherally welded interface of the cover and the blade. Bellows 110 can generally conform to the shape of annular pockets, cylindrical ribs, or other internal blade features of FIG. 1. In the example of FIG. 2, bellows 110 are placed and secured entirely on the second die half 104. When actuated, some or all of the plurality of bellows 110 are arranged in a manner to provide pressure at approximately a 90 degree angle to a plane best fitting the surface at each of the plurality of nodes or rib junctions. Each node can be defined by an intersection of two or more rib portions (e.g., cylindrical portions 20 and/or linear portions 24) shown in FIG. 1.

FIGS. 3-5B, discussed together, show one example geometry of bellows 110 in conjunction with blade assembly 10. The first die half 102 and/or the second die half 104 includes a plurality of protrusions 114 for engaging a hollow portion 116 of one or more of the plurality of bellows 110. Retainer 118 is disposed annularly between ones of plurality of protrusions 114 and the corresponding hollow portion 116 of one or more of the plurality of bellows 110. Optionally, the retainer 118 includes at least one knife-edge seal 120 for engaging a mating knife edge machined into a recessed flat where a flange of bellows 110 resides.

Figure 5A:
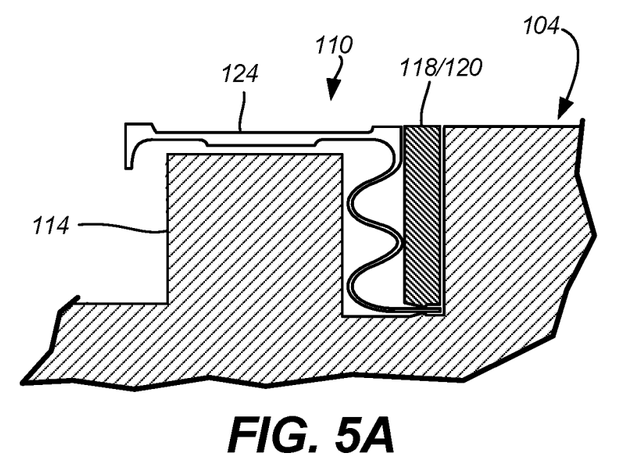
FIG. 5A is a sectional view taken across line 5A-5A of FIG. 4.
Figure 5B:
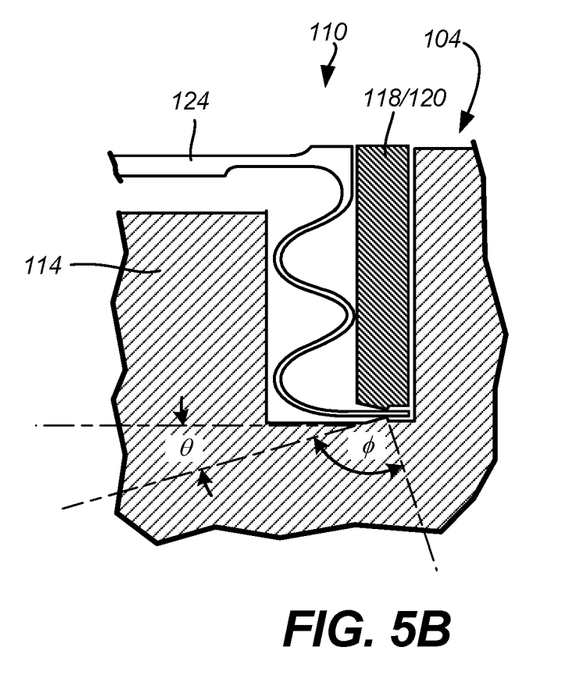
FIG. 5B shows an exploded partial view of FIG. 5A depicting a knife-edge pressuring sealing design.

With reference to FIG. 5B in particular, knife-edge seal 120 can be machined into retainer 118 and into first die half 102 and/or second die half 104, adapted to pinch the flange of bellows 110 between to create a leak-free seal. The knife-edge is defined by angle $\Theta$ being about 30° relative to a horizontal plane. and angle $\Phi$ being about 90° relative to angle $\Theta$. The flange of bellows 110 can be provided with a heavy copper-based plating onto one or both surfaces to enhance engagement and subsequent sealing by mating knife-edge(s) 120. Alternatively, a copper gasket (not shown) may be placed between knife-edge(s) 120 and the flange of bellows 110.

A plurality of bellows are selectively operated with gas pressure to locally press the cavity-back blade and cover together at strategically placed circular locations (i.e., nodes) about the welded interface of the blade and the cover. This generally can include but is not precisely limited to areas normal to circular rib portions 20 (shown in FIG. 1).

Figure 3:
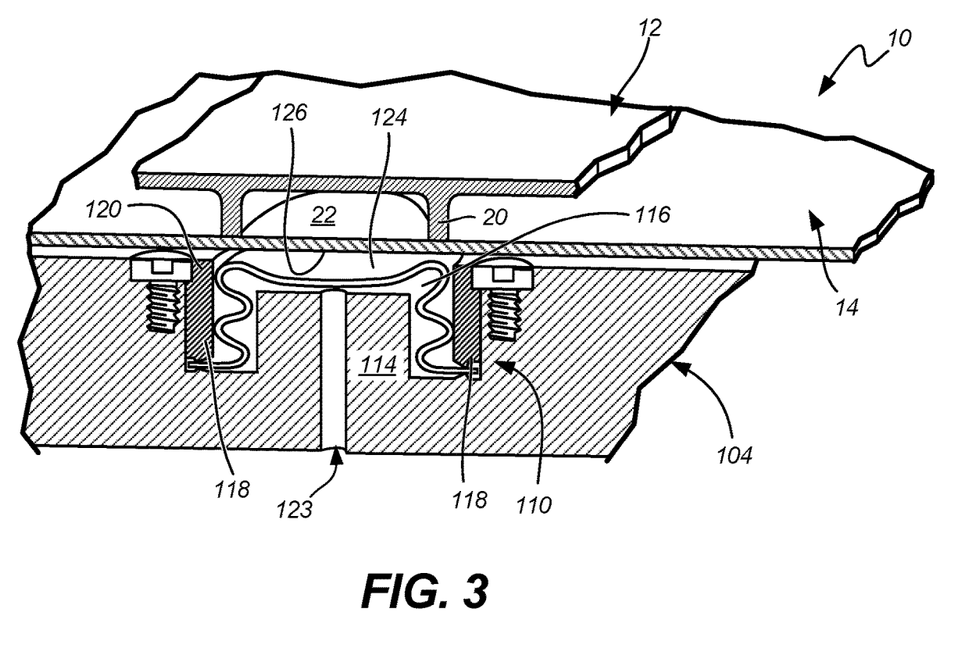
FIG. 3 shows a cut-away of a cavity-back blade body with the blade cover and bellows operating at the interface or node.
Figure 4:
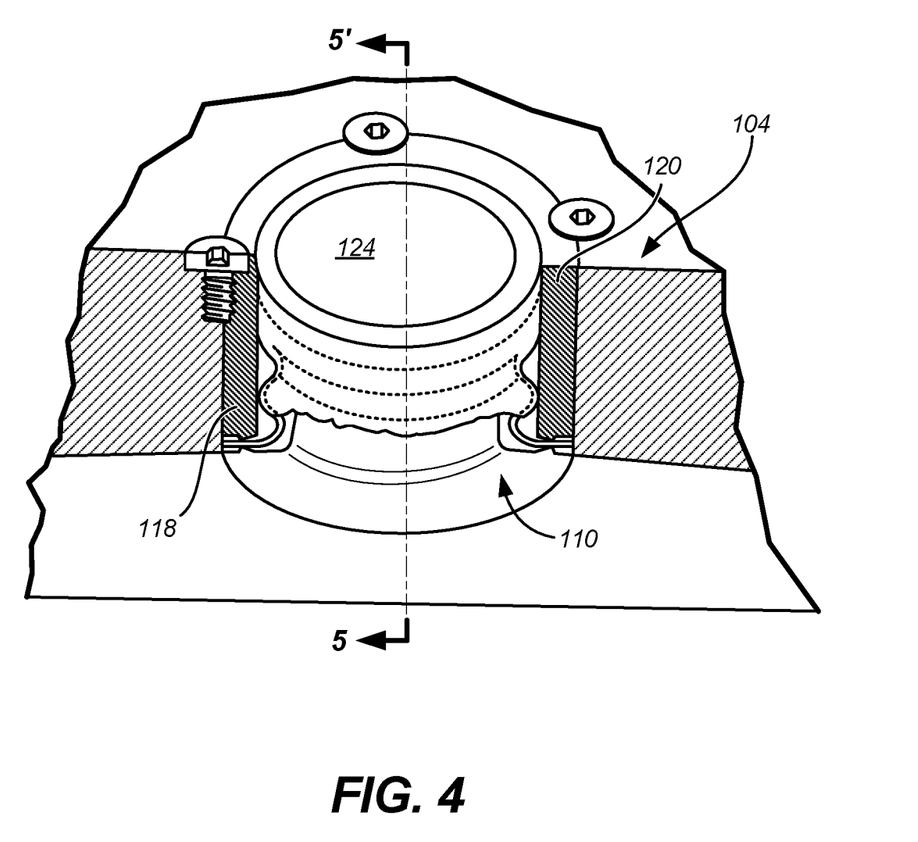
FIG. 4 is a detailed view of one example of an individual bellows.

A recessed catenary 124 can additionally or alternatively be disposed above or atop each of the bellows 110 between ones of the plurality of protrusions and the corresponding one or more of the plurality of bellows. This recessed catenary 124 has the benefit of concentrating the pressure for effecting robust diffusion bonds onto the tops 36 of circular ribs 20, while preventing distortion of the cover 14 over the interiors of annular pockets 22 during the diffusion bonding operation. Referring to FIG. 3, recessed catenary 124 prevents bellows 110 from contacting cover 14 over area 126, thus preventing movement of cover 14 into annular cavity 22.

Bellows 110 can also include various means for generating localized heating at a plurality of interfaces between the blade cover 14 and the plurality of nodes (e.g., cylindrical rib portions 20). The heating means can be in electrical or other thermal communication via port 123, or other separate passageway, through one or both of first die half 102 and second die half 104. Specific examples are discussed later, but generally the heating means, in the vicinity of bellows hollow portion 116, are sufficient to elevate a temperature of the first and second die halves 102, 104 for diffusion bonding, brazing, and/or creep-forming a combination of cavity-back blade 12 and cover 14. For a three-dimensional cavity-back blade, this also has the effect of relieving stresses resulting from the initial peripheral weld (shown in FIG. 1) while maintaining the desired blade twist angle(s). In the context of titanium alloys, for example, the heating means are sufficient to locally elevate the temperature at the interface to a range of about 700° C. (1290° F.) to about 870° C. (1600° F.). To prevent surface contamination during bonding and further facilitate localized bonding and temperature control, the diffusion bonding, brazing, and/or creep-forming operations utilizing bellows 110 will be performed in a vacuum, or a vacuum having a partial pressure of inert gas, e.g., argon, relative to an ambient condition. Alternatively, the process can be performed at atmospheric or greater pressures of argon in a vessel.

Figure 6:
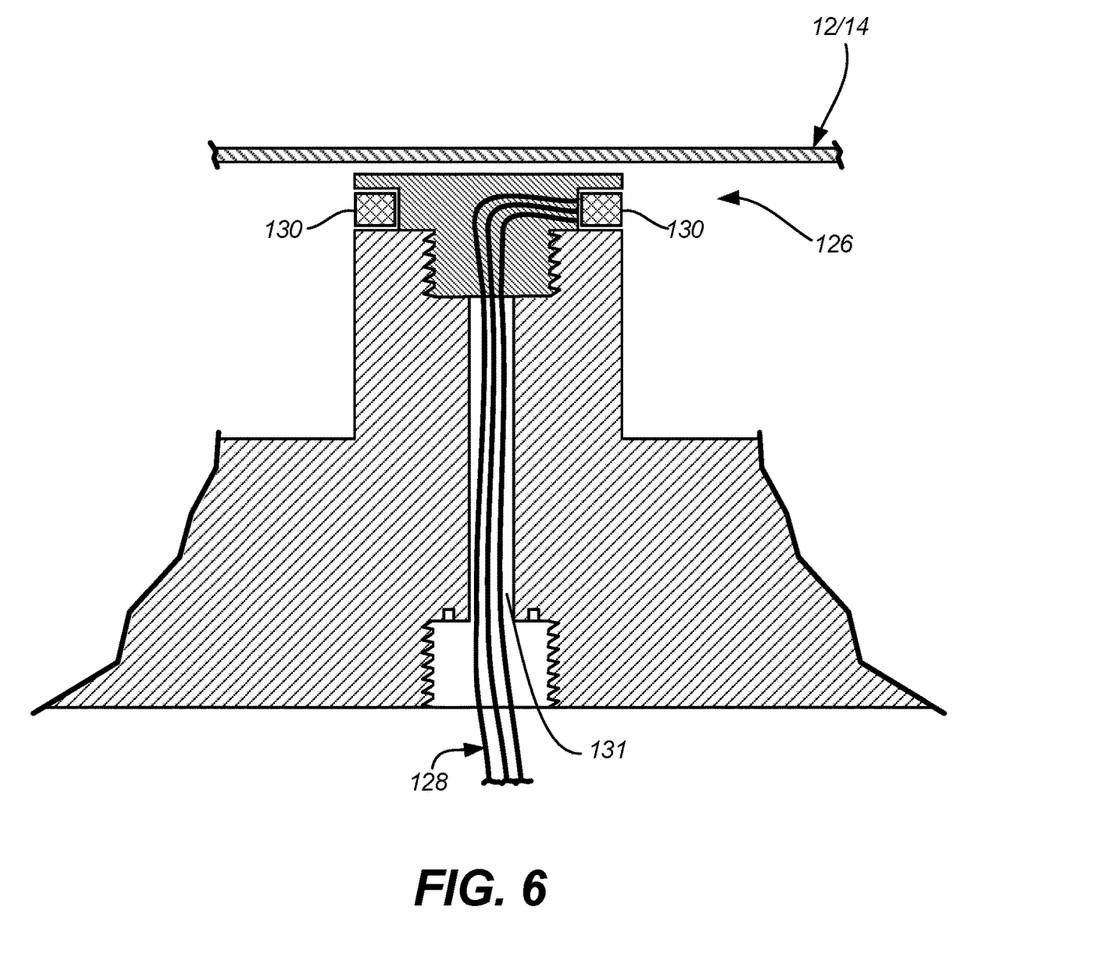
FIG. 6 shows a first method for generating localized heating at an interface of the blade cover and ribs (i.e., nodes).

FIG. 6 shows details of a first example heating element 126 for generating localized heating around a bellows 110. Here, heating element 126 includes a circular resistance heating element 130 adjacent to one of the plurality of interfaces between cavity-back blade 12 and cover 14. Wires 128 extend through one of first die half 102 and/or second die half 104 via conduit 131 to provide power for element 126.

Figure 7:
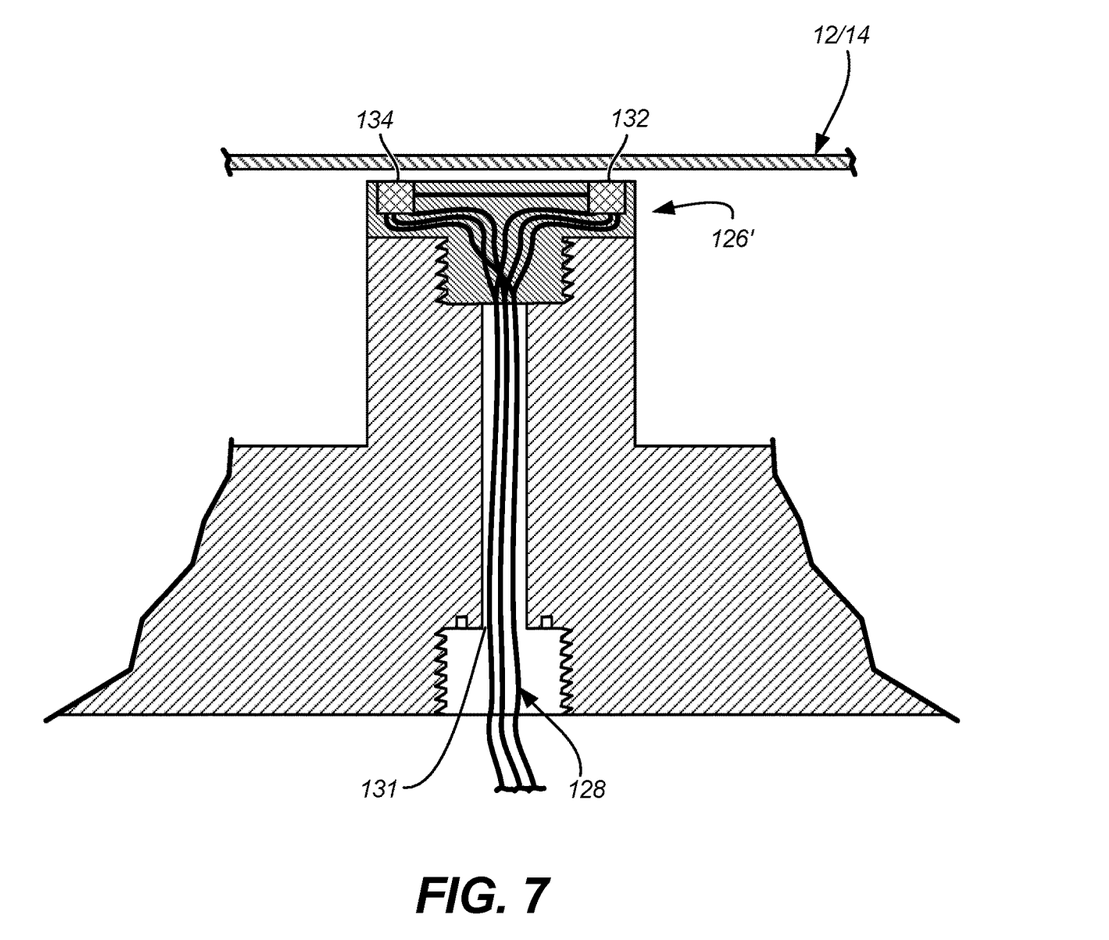
FIG. 7 shows a second example method for generating localized heating at an interface of the blade cover and ribs (i.e., nodes).

FIG. 7 shows a second example heating element 126', where localized heating is provided by at least one of a quartz heater 132 and a light emitting diode 134 in electrical communication through one of first die half 102 and/or second die half 104, also via wires 128 through conduit 131. Note that in FIGS. 6 and 7, ports to pressurize bellows 110 are also to be included but are omitted for clarity).

Figure 8:
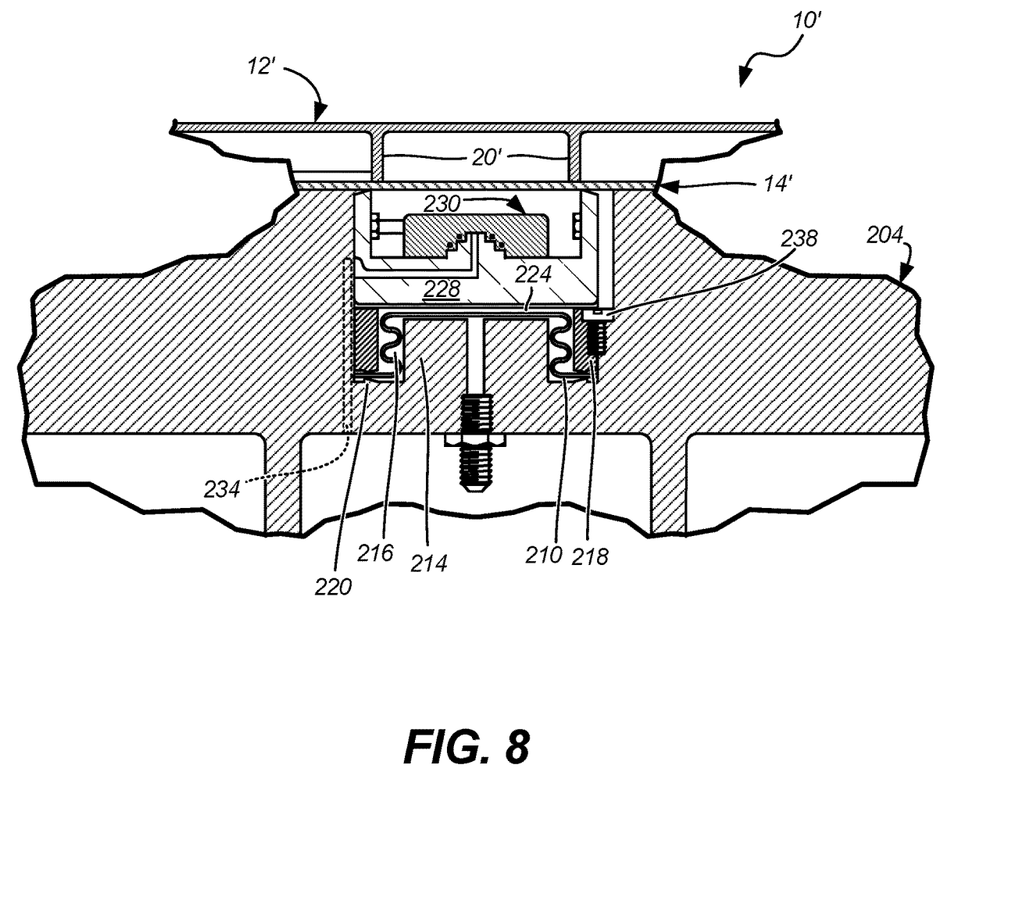
FIG. 8 shows a sectional view of a cavity-back blade body with the blade cover and bellows-actuated carrier and heater operating at the interface or node.

FIG. 8 shows a sectional view of a cavity-back blade body with the blade cover and bellows-actuated carrier and heater operating at an example interface or node. Similar to FIG. 3, the alternate embodiment of FIG. 8 shows bellows 210 in conjunction with blade assembly 10' (peripherally welded combination of cavity-back blade 12' and cover 14'). The first die half (not shown) and/or the second die half 204 includes a plurality of protrusions 214 for engaging a hollow portion 216 of one or more of the plurality of bellows 210. Retainer 218 is disposed annularly between ones of plurality of protrusions 214 and the corresponding hollow portion 216 of one or more of the plurality of bellows 210.

Knife-edge seal 220 can be used on bellows retainer 218 to pinch the bellows flange against a mating knife edge machined into a recessed flat where the bellows flange resides, thereby creating a seal so bellows 210 can be repeatedly pressurized during operation via port 123 without leaking. To further facilitate repeated cyclical stresses and pressurization, bellows 210 can be provided with a heavy copper-based plating on both surfaces of the flange portion of the bellows onto which the knife edges bite into. When retainer 218 is tightened down by fasteners 238, upper and the lower knife-edges 220 cut into the copper-based plating.

Gas pressure is applied to bellows hollow portion 216 to actuate bellows 210, thus providing movement of carrier 228 and integral heating device 230, which ultimately provides pressure to cover 14' to achieve diffusion bonding to tops 24 of circular ribs 20'. Similar to other embodiments, this generally can include but is not precisely limited to areas normal to other circular rib portions 20, located both around and inward of the peripheral weld/cover interface (shown in FIG. 1).

Recessed catenary 224 forms the top of each of bellows 210 between ones of the plurality of protrusions 214 and the corresponding one or more of the plurality of bellows 210. In this embodiment, the recessed catenary 224 ensures an outermost or diametrically outward load path and proper movement of carrier 228, thus enabling delivery of uniform pressure for effecting robust diffusion bonding of cover 14' onto the tops of circular ribs 20'. The rigid structure of the translating ceramic or metallic heating device prevents distortion of the cover 14 over the interiors of annular pockets 22' during the operation.

The example configuration of FIG. 8 can offer additional processing and end product advantages in that the bellows 210 is positioned well below the die surface. As such, the bellows can operate at temperatures cooler than the example embodiments shown in FIGS. 3, 4, 5A, and 5B. This difference has been shown to be on the order of several hundred degrees Fahrenheit. Lower operating temperature of bellows 210 enables greater operating pressure for the bellows and in turn, increased diffusion bond pressure to ensure improved contact area between and around mating parts being diffusion bonded (e.g., cover 14' and circular ribs 20'), resulting in improved bond strength. This also offers greater processing flexibility with potentially extended useful life of bellows 210.

Bellows 210 can also include various means for generating localized heating at a plurality of interfaces between the blade cover 14' and the plurality of nodes (e.g., cylindrical rib portions 20'). Heating means can include those described with reference to FIGS. 6 and 7, as well as a metal and/or ceramic heater element 230. In the example of electric heating elements, access passage 234 through either die half can include suitable wiring for electrical communication. Temperature resistant ceramic (e.g., silicon nitride) carrier 228 can hold the heating element(s) in place between bellows 210 and blade assembly 10'. In certain embodiments, carrier 228 also shields circumferentially fasteners 238 which have the effect of interlocking the base of bellows 210.

With respect to a related method, pressure is applied to the entire blade surface and requires shaping an airfoil from a flat configuration to a 3-dimensional configuration. In the primary example of this disclosure, a peripheral weld would initially join a 3-dimensional thin-walled, hot formed or superplastically formed, metal cover engaged into its recessed mating opening in a hollow 3-dimensional machined metal cavity-back blade body, to create the blade assembly. The 3-dimensional welded blade assembly would then be placed within dies with one die-half or both die-halves having a plurality of circular bellows similar to those shown and described, and localized pressure would be provided at thin-ribbed circular nodes (See FIG. 1). These small circular bellows are adapted to produce a load at the interface that is sufficient to create a low temperature diffusion bond. At least a portion of the plurality of bellows are arranged in a manner to provide localized pressure to the cover at approximately a 90 degree angle to each of a plurality of nodes, (e.g., along a plane best fitting each of the plurality of nodes or rib junctions). Each node can be defined by an intersection of two or more ribs in the cavity-back blade.

During this bonding process, the cover's peripheral weld would be stress relieved and the blade body would be concurrently minimally creep-formed within the dies' 3-dimensional configuration. Upon completion of the bonding/creep-forming/stress relief operation, the blade would be removed from the dies and subsequently CAT-scanned for weld/bond integrity.

A retainer can be positioned annularly between ones of plurality of die protrusions and the corresponding hollow portion of one or more of the plurality of bellows. The retainer optionally includes at least one knife-edge seal adapted to pinch the bellows flange against a mating knife edge machined into a recessed flat where the bellows flange resides. A recessed catenary can be positioned above each of the bellows between ones of the plurality of protrusions and the corresponding one or more of the plurality of bellows.

While the current disclosure focuses on diffusion bonding a 3-dimensional (twisted) cavity-back airfoil blade body and a hot formed or superplastic formed 3-dimensional cover together to create a 3-dimensional (twisted) product, such processing is expected to be adaptable and suitable for diffusion bonding of hollow blades or hollow vanes in a planar (i.e., flat) configuration.

Discussion of Possible Embodiments

The following are non-exclusive descriptions of possible embodiments of the present disclosure.

An embodiment of an apparatus includes means for peripheral welding a cavity-back blade and a cover of the cavity-back blade to form a 3-dimensional hollow blade assembly, and a plurality of bellows contained in one or both of a first die half and a second die half receiving the hollow blade. The plurality of bellows are disposed around or inward of the peripherally welded interface of the cover and the blade. At least a portion of the bellows are arranged in a manner to provide pressure to the cover at approximately a 90 degree angle to each of a plurality of nodes, each node defined by an intersection of two or more ribs in the cavity-back blade.

The apparatus of the preceding paragraph can optionally include, additionally and/or alternatively, any one or more of the following features, configurations and/or additional components:

An apparatus, according to an exemplary embodiment of this disclosure, among other possible things includes means for peripheral welding a hollow cavity-back blade and a cover of the cavity-back blade to form a 3-dimensional hollow blade assembly; a first die half and a second die half for receiving the hollow blade assembly; and a plurality of bellows contained in one or both of the first and second die halves, and disposed around or inward of the peripherally welded interface of the cover and the blade; wherein at least a portion of the plurality of bellows are arranged in a manner to provide pressure to the cover at approximately a 90 degree angle to each of a plurality of nodes, each node defined by an intersection of two or more ribs in the cavity-back blade.

A further embodiment of the foregoing fixture, wherein the first die half or the second die half includes a plurality of protrusions for engaging a hollow portion of one or more of the plurality of bellows.

A further embodiment of any of the foregoing fixtures, further comprising a retainer disposed annularly between ones of plurality of protrusions and the corresponding hollow portion of one or more of the plurality of bellows.

A further embodiment of any of the foregoing fixtures, wherein the retainer includes at least one knife-edge seal for engaging a bellows flange against a mating knife edge machined into a recessed flat where the bellows flange resides.

A further embodiment of any of the foregoing fixtures, further comprising a recessed catenary disposed above each of the bellows between ones of the plurality of protrusions and the corresponding one or more of the plurality of bellows.

A further embodiment of any of the foregoing fixtures, further comprising means for generating localized heating at a plurality of interfaces between the blade cover and the plurality of nodes, the heating means sufficient to elevate a temperature of the first and second die halves for diffusion bonding, brazing, and/or creep-forming a combination of the cavity-back blade and the cover.

A further embodiment of any of the foregoing fixtures, wherein the combination of the cavity-back blade and the cover are titanium alloys, and the heating means are sufficient to locally elevate the temperature to a range of 1300° F. to 1600° F. in the areas to be diffusion bonded.

A further embodiment of any of the foregoing fixtures, wherein the means for generating localized heating comprises a circular heating element adjacent to one of the plurality of interfaces, the circular heating element in electrical communication through one of the first die half and the second die half.

A further embodiment of any of the foregoing fixtures, wherein the means for generating localized heating further comprises at least one of a quartz heater and a light emitting diode in electrical communication through one of the first die half and the second die half.

A further embodiment of any of the foregoing fixtures, wherein the hollow blade assembly is a 3-dimensional machined assembly, and wherein the first and second die halves are shaped to maintain a twist of about 20° to about 40° relative to a chordwise direction of the combination of the cavity-back blade and the cover, and the plurality of bellows are positioned and operative to diffusion bond the cavity-back blade and the cover atop or around a plurality of circular ribs at the plurality of nodes.

An embodiment of a method for making a hollow metal blade includes peripherally welding a cavity-back blade and a cover around an interface therebetween. The cover is adapted to engage an opening in the hollow cavity-back blade combining the blade and the cover to form a 3-dimensional hollow blade assembly. The welded hollow blade assembly is placed in a die having a first die half and a second die half to accept the hollow blade assembly. A plurality of bellows are selectively operated to locally press the hollow cavity-back blade assembly together at a plurality of nodes) around or inward of the welded interface of the blade and the cover. A plurality of bellows are arranged in a manner to provide localized pressure to the cover at approximately a 90 degree angle to each of the plurality of nodes, each node defined by an intersection of two or more ribs in the hollow cavity-back blade assembly.

The method of the preceding paragraph can optionally include, additionally and/or alternatively, any one or more of the following features, configurations and/or additional components:

A method according to an exemplary embodiment of this disclosure, among other possible things, includes peripherally welding a hollow cavity-back blade and a cover around an interface therebetween, the cover adapted to engage an opening in the hollow cavity-back blade combining the blade and the cover to form a 3-dimensional hollow blade assembly; placing the hollow blade assembly in a die having a first die half and a second die half to maintain the 3-dimensional twist of the hollow blade; and operating a plurality of bellows to selectively and locally press the hollow blade and cover together around or inward of the peripherally welded interface of the cover and the blade; wherein at least a portion of the plurality of bellows are arranged in a manner to provide localized pressure to the cover at approximately a 90 degree angle to each of a plurality of nodes, each node defined by an intersection of two or more ribs in the cavity back blade assembly.

A further embodiment of the foregoing method, wherein the plurality of bellows provide localized pressure at each node with a load sufficient to create a low temperature diffusion bond around each node.

A further embodiment of any of the foregoing methods, wherein the peripherally welded interface is stress relieved and the blade is minimally creep-formed into a final 3-dimensional configuration corresponding to the first and second die halves.

A further embodiment of any of the foregoing methods, wherein the first die half or the second die half includes a plurality of protrusions adapted to engage a hollow portion of one or more of the plurality of bellows.

A further embodiment of any of the foregoing methods, further comprising: prior to operating the plurality of bellows, positioning a retainer annularly between ones of plurality of protrusions and the corresponding hollow portion of one or more of the plurality of bellows, the retainer including at least one knife-edge seal for engaging a bellows flange against a mating knife edge machined into a recessed flat where the bellows flange resides.

A further embodiment of any of the foregoing methods, further comprising: prior to operating the plurality of bellows, positioning a recessed catenary disposed above each of the bellows between ones of the plurality of protrusions and the corresponding one or more of the plurality of bellows.

A further embodiment of any of the foregoing methods, wherein the combination of the cavity-back blade and the cover are titanium alloys, and the heating means are sufficient to elevate the temperature to a range of 1300° F. to 1600° F. in the areas to be diffusion bonded.

A further embodiment of any of the foregoing methods, wherein localized heating is provided by a circular heating element adjacent to one of the plurality of nodes, the circular heating element aligned with a corresponding circular rib in the hollow blade assembly.

A further embodiment of any of the foregoing methods, wherein the hollow blade assembly is a 3-dimensional machined assembly, and wherein the first and second die halves maintain a twist of about 20° to about 40° relative to a chordwise direction of the combination of the cavity-back blade and the cover.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus comprising:
   means for peripherally welding a hollow cavity-back blade and a cover of the cavity-back blade to form a 3-dimensional hollow blade assembly;
   a first die half and a second die half for receiving the 3-dimensional hollow blade assembly, the first die half or the second die half including a plurality of protrusions;
   a plurality of bellows, each including a hollow portion configured to be engaged by corresponding ones of the plurality of protrusions, each bellows contained in one or both of the first and second die halves, and disposed around or inward of the peripherally welded interface of the cover and the blade; and
   a recessed catenary supported above each of one or more of the plurality of bellows between ones of the plurality of protrusions and the corresponding one or more of the plurality of bellows;
   wherein at least a portion of the plurality of bellows are arranged in a manner to provide pressure to the cover at approximately a 90 degree angle to each of a plurality of nodes, each node defined by an intersection of two or more ribs in the cavity-back blade.

2. The apparatus of claim 1, further comprising a bellows retainer disposed annularly outward of ones of the plurality of protrusions and the corresponding hollow portion of one or more of the plurality of bellows.

3. The apparatus of claim 2, wherein the bellows retainer includes at least one knife-edge seal for engaging a bellows flange against a mating knife edge machined into a recessed flat surface where the bellows flange resides.

4. The apparatus of claim 1, further comprising means for generating localized heating at a plurality of interfaces between the blade cover and the plurality of nodes, the heating means sufficient to elevate a temperature of the first and second die halves for diffusion bonding, brazing, stress-relieving, and/or creep-forming a combination of the cavity-back blade and the cover.

5. The apparatus of claim 4, wherein the heating means are sufficient to locally elevate the temperature of a titanium workpiece to a range of 1300° F. to 1600° F.

6. The apparatus of claim 5, wherein the means for generating localized heating comprises a circular heating element adjacent to one of the plurality of interfaces, the circular heating element in electrical communication through one of the first die half and the second die half.

7. The apparatus of claim 6, wherein the means for generating localized heating further comprises at least one of a quartz heater and a light emitting diode in electrical communication through one of the first die half and the second die half.

8. The apparatus of claim 1, wherein the first and second die halves are shaped to maintain a twist of about 20° to about 40° relative to a chordwise direction of the combination of the cavity-back blade and the cover, and the plurality of bellows are positioned and operative to diffusion bond the cavity-back blade and the cover atop or around a plurality of circular ribs at the plurality of nodes.

9. A method for making a hollow metal blade, the method comprising:
   peripherally welding a hollow cavity-back blade and a cover around an interface therebetween, the cover adapted to engage an opening in the hollow cavity-back blade combining the blade and the cover to form a 3-dimensional hollow blade assembly;

placing the 3-dimensional hollow blade assembly in a die having a first die half and a second die half to maintain the 3-dimensional twist of the hollow blade, the first die half or the second die half including a plurality of protrusions; and positioning a plurality of bellows in one or both of the first and second die halves, each including a hollow portion configured to be engaged by corresponding ones of the plurality of protrusions, positioning a retainer annularly between ones of plurality of protrusions and the corresponding hollow portion of one or more of the plurality of bellows, the retainer including at least one knife-edge seal for engaging a bellows flange against a mating knife edge machined into a recessed flat where the bellows flange resides;

positioning a recessed catenary disposed above each of the bellows between ones of the plurality of protrusions and the corresponding one or more of the plurality of bellows; and operating the plurality of bellows to selectively and locally press the hollow blade and cover together around or inward of the peripherally welded interface of the cover and the cavity-back blade;

wherein at least a portion of the plurality of bellows are arranged in a manner to provide pressure to the cover at approximately a 90 degree angle to each of a plurality of nodes, each node defined by an intersection of two or more ribs in the cavity-back blade.

10. The method of claim 9, wherein the plurality of bellows provide localized pressure at each node with a load sufficient to create a low temperature diffusion bond around each node.

11. The method of claim 10, wherein the peripherally welded interface is stress relieved and the blade is minimally creep-formed into a final 3-dimensional configuration corresponding to the first and second die halves.

12. The method of claim 10, wherein the combination of the cavity-back blade and the cover are titanium alloys, and the heating means are sufficient to elevate the temperature to a range of 1300° F. to 1600° F. in the areas to be diffusion bonded.

13. The method of claim 9, wherein localized heating is provided by a circular heating element adjacent to one of the plurality of nodes, the circular heating element aligned with a corresponding circular rib in the hollow blade assembly.

14. The method of claim 9, wherein the first die half and/or the second die half maintain a twist of about 20° to about 40° relative to a chordwise direction of the combination of the cavity-back blade and the cover.

* * * * *